Figure 1:
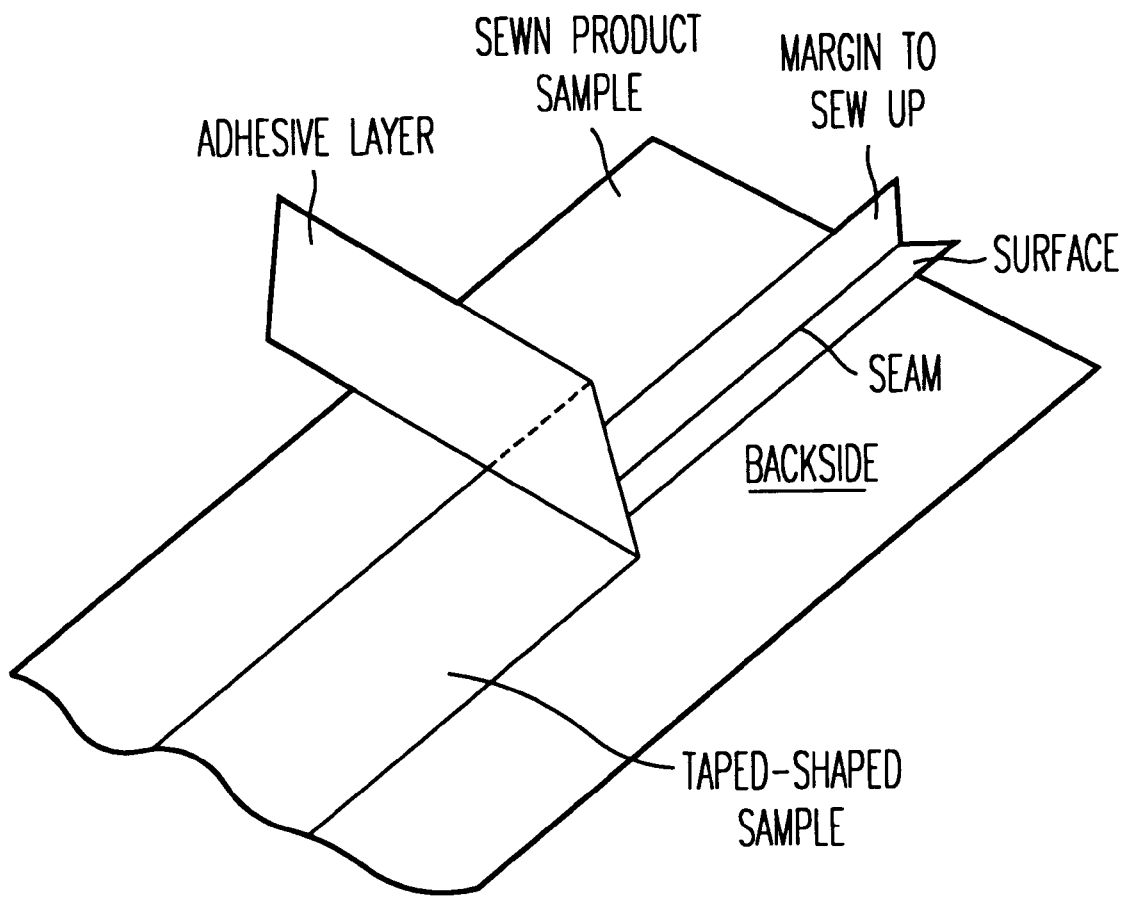

United States Patent

Tada et al.

[11] Patent Number: 6,087,463
[45] Date of Patent: Jul. 11, 2000

[54] REACTIVE HOT MELT ADHESIVE AND ADHESIVE COMPOSITE SHEET MATERIAL

[75] Inventors: Masako Tada, Kawasaki; Kaoru Oguro, Tokyo; Josho Kashiwame, Kawasaki, all of Japan

[73] Assignee: Asahi Glass Company Ltd., Tokyo, Japan

[21] Appl. No.: 09/185,574

[22] Filed: Nov. 4, 1998

[30] Foreign Application Priority Data

Nov. 5, 1997 [JP] Japan ..................................... 9-303072

[51] Int. Cl.⁷ ............................... C08G 18/10; C09J 7/02
[52] U.S. Cl. ....................... 528/45; 428/355 N; 428/351; 528/905
[58] Field of Search ................. 428/355 N, 351; 528/905, 45, 61, 65; 156/331.4, 331.7

[56] References Cited

U.S. PATENT DOCUMENTS

| 4,166,873 | 9/1979 | Gilliam et al. | 428/35 |
| 4,409,340 | 10/1983 | Stolzenbach et al. | 521/159 |
| 5,100,995 | 3/1992 | Münzmay et al. | 528/45 |
| 5,284,918 | 2/1994 | Huynh-Tran et al. | 525/124 |

FOREIGN PATENT DOCUMENTS

| 0 248 658 | 12/1987 | European Pat. Off. . |
| 0 419 928 | 4/1991 | European Pat. Off. . |
| WO 91/18069 | 11/1991 | WIPO . |

OTHER PUBLICATIONS

Derwent Abstracts, AN 92–352704, JP 04 253785, Sep. 9, 1992.

*Primary Examiner*—Daniel Zirker
*Attorney, Agent, or Firm*—Oblon, Spivak, McClelland, Maier & Neustadt, P.C.

[57] ABSTRACT

A reactive hot melt adhesive containing, as the main component, a blocked prepolymer made by reacting a linear prepolymer having isocyanate groups with a blocking agent, said blocked prepolymer having a number average molecular weight of at least 11,000 and a melt viscosity of at least 1,000 poise at a temperature of 110° C.

18 Claims, 1 Drawing Sheet ature of 110° C.

REACTIVE HOT MELT ADHESIVE AND ADHESIVE COMPOSITE SHEET MATERIAL

The present invention relates to a reactive hot melt adhesive which undergoes dissociation of blocking agent at a relatively low temperature and can be processed by extrusion, and which is excellent in heat resistance after being adhered and cured; and its use.

Conventional adhesives may, for example, be of a solvent type, a hot melt type or a reaction type.

The hot melt type adhesive does not require a solvent and thus is ecologically good. Further, the bonding completes upon curing by cooling. Thus it has an advantage that the initial bonding is quick. Accordingly, its demand is increasing. However, its base material is a thermoplastic resin, and there is a problem that it is poor in heat resistance, bonding strength and chemical resistance.

The reaction type adhesive has high bonding strength and is excellent in heat resistance, as it undergoes crosslinking after bonding. However, it takes a relatively long time for the reaction for curing, and the bonding strength immediately after bonding as of the hot melt type adhesive can not be attained.

A reactive hot melt adhesive was proposed, as an adhesive having the operation efficiency and high initial bonding strength of the hot melt type adhesion, and the high heat resistance and high bonding strength of the reaction type adhesive simultaneously. A prepolymer having isocyanate groups at the ends is used for the reactive hot melt adhesive. As it has a crosslinking property, it is excellent in heat resistance and chemical resistance, and further, the bonding strength is good. However, it has poor storage stability and is likely to react with water in the air. Therefore, it is required to be stored in a sealed container and there are problems also in its handling during use.

It was attempted to improve the storage stability by blocking isocyanate groups of a urethane polymer, as disclosed in JP-A-62-138573 (EP 224848) and JP-A-4-253785. However, there were the following drawbacks.

Namely, JA-A-4-253785 discloses a method in which a melt of an adhesive which is block-dissociated by heat melting during use, is coated on a base material, followed by bonding with another base material. However, it is necessary to bond with another base material immediately after the melt of the block-dissociated adhesive is coated on the base material, and there is a drawback that once the adhesive is coated on the base material, it can not be stored as it is.

Further, JP-A-62-138573 (EP 224848) discloses a method in which a liquid adhesive synthesized by one shot method is coated by spraying on a base material to form a coating film of the adhesive, followed by press bonding and then by heating for block dissociation and bonding. It is possible to store the adhesive coating film as it has been formed initially, and at the time of bonding, it is subjected to heating for the block-dissociation and bonding. However, there was a drawback from the nature of the adhesive that the processable form was limited to the form of a film fixed on a base material. Further, there was a drawback with the spray coating method that it was difficult to make the film thickness uniform.

Therefore, an adhesive has been desired with which the form can freely be designed beforehand depending on the particular application and the storage is easy.

On the other hand, for the purpose of waterproof, it has been common to bond a sealing tape, along the seam portion of a sewn product made of a waterproof sheet material. For example, JP-B-47-6070 proposes a laminate comprising a surface layer having water resistance and heat stability simultaneously, and a polyethylene hot melt adhesive layer, as a sealing tape for a sewn product made of a waterproof sheet material which is made of a laminate of a polyethylene film and a fabric. The sealing tape comprising such a polyethylene hot melt adhesive, has performed a very important role in the area of waterproof clothing.

However, along with developments of the materials for waterproof sheets as adherends and of their applications, the number of cases is increasing where conventional sealing tapes are no longer applicable. The reasons are such that as the types of the materials have increased, various bonding properties are required for adherends made of various materials; it is required to improve the bonding speed in order to raise the production speed and thereby to reduce the cost; and as the applications of sewn products made of waterproof sheet materials have increased, durability of the products, particularly heat resistance or chemical resistance, is required under various conditions.

Accordingly, an adhesive has been desired which is suitable for use as a sealing tape or the like, and capable of bonding waterproof sheets made of various materials and melt-bonding in a short period of time, and which presents heat resistance, chemical resistance and water resistance after bonding.

It is an object of the present invention to overcome the above-mentioned drawbacks of the prior art and to provide an adhesive with which it is easy to make the thickness of the adhesive layer uniform and the working efficiency at work site can be improved, and which is excellent in heat resistance after bonding and in storage stability. Particularly, it is an object to provide an adhesive having a high bonding property, which is applicable to base materials made of flexible fabrics and/or synthetic resins.

Another object of the present invention is to provide an adhesive composite sheet material with which a satisfactory bonding strength can be attained for a sewn product made of a waterproof sheet, and which provides good feeling and has heat resistance, chemical resistance and water resistance.

The present invention provides a reactive hot melt adhesive containing, as the main component, a blocked prepolymer made by reacting a linear prepolymer having isocyanate groups with a blocking agent, said blocked prepolymer having a number average molecular weight of at least 11,000 and a melt viscosity of at least 1,000 poise at a temperature of 110° C., and a reactive hot melt adhesive containing, as the main component, a blocked prepolymer made by reacting a linear prepolymer having isocyanate groups with a blocking agent and a low molecular weight diol having a hydroxyl number of higher than 400, said blocked prepolymer having a number average molecular weight of at least 11,000 and a melt viscosity of at least 1,000 poise at a temperature of 110° C.

The present invention further provides an adhesive composite sheet material comprising an adhesive layer made of the above-mentioned reactive hot melt adhesive and a surface layer laminated therewith.

In the accompanying drawing, FIG. 1 is a schematic view illustrating the sealing sample used in Examples.

Prepolymer

The linear prepolymer having isocyanate groups of the present invention can be prepared as described hereinafter by using bifunctional materials, i.e., an organic diisocyanate and a high molecular weight diol having a hydroxyl number of from 40 to 400, and if necessary, a low molecular weight diol having a hydroxyl number of higher than 400.

Organic Diisocyanate

The organic diisocyanate which can be used in the present invention may, for example, be an aromatic diisocyanate such as 4,4'-diphenylmethane diisocyanate, xylene diisocyanate, or tolylene diisocyanate, an aliphatic diisocyanate such as 1,6-hexamethylene diisocyanate, or an alicyclic diisocyanate such as hydroganated 4,4'-diphenylmethane diisocyanate or isophorone diisocyanate.

High Molecular Weight Diol having a Hydroxyl Number of from 40 to 400

As the high molecular weight diol having a hydroxyl number of from 40 to 400, e.g. polyesterdiol, polyetherdiol, polylactonediol or polycarbonatediol is preferred.

The polyester diol is preferably one obtained by reacting a dicarboxylic acid and a low molecular weight diol. As the dicarboxylic acid, e.g. phthalic acid, isophthalic acid, terephthalic acid, succinic acid, adipic acid, suberic acid or sebacic acid may be mentioned. As the low molecular weight diol, e.g. ethylene glycol, diethylene glycol, 1,3-propanediol, 1,4-butanediol, 1,5-pentanediol or 1,6-hexanediol may be mentioned.

As the polyether polyol, e.g. polyoxyethylene glycol, polyoxypropylene glycol, polyoxyethylene oxypropylene glycol, or polyoxytetramethylene glycol may be mentioned.

As the polylactonediol, e.g. polycaprolactone glycol, polyvalerolactone glycol or polypropiolactone glycol, which can be obtained by ring-opening polymerization of various lactones, may be mentioned.

As the polycarbonate diol, one obtained by condensation of a low molecular weight diol such as ethylene glycol, propylene glycol, 1,4-butanediol or 1,6-hexanediol, with e.g. ethylene carbonate, diethyl carbonate or diphenyl carbonate, may be mentioned.

The hydroxyl number of such a high molecular weight diol is preferably from 40 to 190, particularly preferably from 50 to 120.

Low Molecular Weight Diol having a Hydroxyl Number of Higher than 400

The low molecular weight diol having a hydroxyl number of higher than 400 to be used in the present invention, as the case requires, is preferably a diol having a hydroxyl number of from 560 to 2,000, and it may, for example, be ethylene glycol, diethylene glycol, 1,3-propanediol, 1,4-butanediol, 1,5-pentanediol or 1,6-hexanediol.

Blocking Agent

As the blocking agent, known compounds can be used.

It may, for example, be a phenol blocking agent such as phenol, cresol, nitrophenol, chlorophenol, ethylphenol or phenylphenol, a lactam blocking agent such as ε-caprolactam, an oxime blocking agent such as acetaldoxime, acetoxime, methyl ethyl ketoxime, 2,3-butanedione mono oxime or cyclohexanone oxime, an alcohol blocking agent such as methanol, ethanol, 1-butanol, 1-propanol, 2-propanol, 1-pentanol, benzyl alcohol, methoxymethanol, 2-chloroethanol, 1-chloro-2-propanol or 1,3-dichloro-2-propanol, and another blocking agent such as acetylacetone, ethyl acetoacetate or diethyl malonate.

Phenol, ε-caprolactam, methyl ethyl ketoxime, methanol, ethanol, 1-propanol and 2-propanol are preferred.

Blocked Prepolymer

The blocked prepolymer of the present invention may be produced by the following methods:

(1) A method of reacting a linear prepolymer having isocyanate groups with a blocking agent.

(2) A method of reacting a linear prepolymer having isocyanate groups with a low molecular weight diol having a hydroxyl number of higher than 400 and a blocking agent.

In the methods (1) and (2), it is preferred to charge and react the reactants so that the amount of the reactive groups in the blocking agent, or the total amount of the reactive groups in the blocking agent and the hydroxyl groups in the low molecular weight diol (hereinafter referred to as "reactive groups and hydroxyl groups"), is at least 0.8 mol, per mol of the isocyanate groups in the linear prepolymer having isocyanate groups. It is preferred to charge and react them so that "reactive groups and hydroxyl groups" per mol of the isocyanate groups is from 0.8 mol to 1.5 mol, particularly from 0.9 mol to 1.4 mol.

Further, the linear prepolymer having isocyanate groups may be produced by the following method (3) or (4).

(3) A method of reacting an organic diisocyanate with a high molecular weight diol having a hydroxyl number of from 40 to 400, so that the isocyanate groups are in excess to hydroxyl groups.

The ratio of the organic diisocyanate to the high molecular weight diol having a hydroxyl number of from 40 to 400 is such that the isocyanate groups are preferably from more than 1 mol to 2 mol, more preferably, from more than 1 mol to 1.5 mol, particularly preferably from more than 1 mol to 1.3 mol, per mol of the hydroxyl groups, in a case where only a blocking agent is reacted later. In a case where a blocking agent and a low molecular weight diol are reacted later, the ratio of the organic diisocyanate to the high molecular weight diol having a hydroxyl number of from 40 to 400 is same as the ratio in the following method (4).

(4) A method of reacting an organic diisocyanate with a high molecular weight diol having a hydroxyl number of from 40 to 400 and a low molecular weight diol having a hydroxyl number of higher than 400 so that the isocyanate groups are in excess to hydroxyl groups.

The ratio of the organic diisocyanate to the high molecular weight diol having a hydroxyl number of from 40 to 400, is such that the isocyanate groups are preferably from more than 1 mol to 3 mol, more preferably, from 1.5 mol to 2.5 mol, per mol of the hydroxyl groups in the high molecular weight diol. The ratio of an organic diisocyanate to the low molecular weight diol having a hydroxyl number of higher than 400, is such that the isocyanate groups are preferably from more than 1 mol to 3 mol, more preferably, from 1.8 mol to 2.8 mol, per mol of the hydroxyl groups in the low molecular weight diol. Further, the isocyanate groups are preferably from more than 1 mol to less than 2 mol, particularly preferably from more than 1 mol to 1.5 mol per mol of the total amount of the hydroxyl groups in the high molecular weight diol and the hydroxyl groups in the low molecular weight diol.

In the methods (3) and (4), the ratio of the organic diisocyanate and the blocking agent is such that the blocking agent is preferably from 0.01 mol to less than 1.0 mol, more preferably from 0.02 mol to 0.5 mol per mol of the organic diisocyanate. The total amount of the whole hydroxyl group and reactive groups in the blocking agent is preferably from more than 1 mol to less than 2 mol, more preferably, from more than 1 mol to less than 1.5 mol, particularly preferably from more than 1 mol to 1.3 mol, per mol of the isocyanate groups based on the organic diisocyanate.

The reactive hot melt adhesive of the present invention containing, as the main component, a blocked prepolymer, is preferably produced particularly by the following method (5), (6) or (7). In order to obtain the blocked prepolymer having a preferred viscosity, the method (7) is particularly preferred.

(5) An organic diisocyanate and a high molecular weight diol having a hydroxyl number of from 40 to 400 are reacted so that the isocyanate groups are from more than 1 mol to 2 mol, preferably, from more than 1 mol to 1.5 mol, particularly preferably from more than 1 mol to 1.3 mol, per mol of the hydroxyl groups, to obtain a linear prepolymer having isocyanate groups. Then, the obtained prepolymer is reacted with a blocking agent.

(6) An organic diisocyanate and a high molecular weight diol having a hydroxyl number of from 40 to 400 are reacted so that the isocyanate groups are from more than 1 mol to 3 mol, per mol of the hydroxyl groups, to obtain a linear prepolymer having isocyanate groups. Then, the obtained prepolymer is reacted with a low molecular weight diol having a hydroxyl number of higher than 400, so that the ratio of the hydroxyl groups and the isocyanate groups in the prepolymer is such that the isocyanate groups are from more than 1 mol to 2 mol per mol of the hydroxyl groups, to obtain a linear prepolymer having isocyanate groups. Further, the obtained prepolymer is reacted with a blocking agent.

(7) An organic diisocyanate and a high molecular weight diol having a hydroxyl number of from 40 to 400 are reacted so that the isocyanate groups are from more than 1 mol to 3 mol, preferably, from 1.5 mol to 2.5 mol per mol of the hydroxyl groups, to obtain a linear prepolymer having isocyanate groups. Then, the obtained prepolymer is reacted simultaneously with from 0.3 mol to less than 1 mol, preferably from 0.3 mol to 0.6 mol of a low molecular weight diol having a hydroxyl number of higher than 400, per mol of the isocyanate groups based on the organic diisocyanate and from 0.01 mol to less than 1.0 mol, preferably from 0.02 mol to 0.5 mol of the blocking agent, per mol of the isocyanate groups of the organic diisocyanate.

The blocking reaction can be carried out either in a solvent or without a solvent. In a case where it is carried out in a solvent, it is preferred to use a solvent having no active hydrogen. Further, in a case where a solvent is used, the solvent is preferably removed after the blocked prepolymer is produced. In the present invention, it is preferred not to use a solvent.

The blocked prepolymer in the present invention has a number average molecular weight of at least 11,000 and the melt viscosity at a temperature of 110° C. of at least 1,000 poise.

If the number average molecular weight is less than 11,000, the normal molding processing such as extrusion molding tends to be difficult. The number average molecular weight is preferably at least 15,000, particularly preferably at least 20,000. Further, at most 100,000 is preferred, at most 50,000 is more preferred, at most 30,000 is particularly preferred. If the melt viscosity at a temperature of 110° C. is less than 1,000 poise, the normal molding processing such as extrusion molding tends to be difficult. The melt viscosity at a temperature of 110° C. is preferably at least 5,000 poise, more preferably at least 15,000 poise, and particularly preferably at least 20,000 poise. Further, at most 100,000 poise is preferred, at most 75,000 poise is more preferred, and at most 50,000 poise is particularly preferred.

Reactive Hot Melt Adhesive

The reactive hot melt adhesive of the present invention contains the blocked prepolymer as the main component. In the present invention, by using the blocked prepolymer having the number average molecular weight of at least 11,000 and the melt viscosity at a temperature of 110° C. of at least 1,000 poise, the blocked prepolymer or the composition containing the blocked prepolymer can be formed into the predetermined shape.

Namely, the reactive hot melt adhesive of the present invention is preferably used as the hot melt adhesive, which is formed by forming the blocked prepolymer or a composition containing the blocked prepolymer into a predetermined shape.

With regard to the shape, it is preferred to form it into a film shape, a tape shape, a tube shape, a bead shape, a powder shape or a flake shape. Particularly, it is preferred to form it into a film shape or a tape shape.

The forming is preferably carried out by extrusion molding. Namely, it is preferred to use as a reactive hot melt adhesive, which is formed by extrusion molding of the blocked prepolymer or a composition containing the blocked prepolymer, at a temperature lower than the dissociation temperature of the blocking agent. By the extrusion molding, it is easy to form it into a film shape or a tape shape.

In a case of forming the material into a film shape or a tape shape, the thickness is not particularly limited, but from 50 $\mu$m to 1 mm is usually suitable.

When the extrusion molding is carried out, the molding temperature depends on the dissociation temperature of the blocking agent (hereinafter referred to as the block dissociation temperature). However, it is usually preferably from 80 to 250° C., more preferably from 80 to 200° C., particularly preferably from 80 to 150° C. The molding temperature is preferably lower than the block dissociation temperature by at least 20° C.

The reactive hot melt adhesive of the present invention may be one which is prepared by blending various additives to the blocked prepolymer. As the additives, those which are commonly used for moisture curable urethane adhesives, such as a curing catalyst, a dissociation catalyst, a plasticizer, a tackifier, various fillers, pigments, wax and a storage-stabilizer, may be mentioned.

The reactive hot melt adhesion can be used as a hot melt adhesion by carrying out the block dissociation by a usual method. Namely, by heating the adhesive at a predetermined temperature in a predetermined time, the blocking agent is taken off, moisture crosslinking occurs, and bonding property is exhibited. The heating temperature is a temperature higher than the block dissociation temperature. The heating temperature depends on the heating time, but it is preferably from 100 to 300° C., more preferably from 100 to 250° C.

The block dissociation can be carried out also under a high humidity condition. The heating temperature under a high humidity condition may be lower than the temperature under normal condition. At a relative humidity of at least 70%, the heating temperature is preferably from 60 to 150° C., more preferably from 70 to 110° C.

The reactive hot melt adhesive of the present invention can be stored in the state of before the block dissociation. For example, it can be stored for six months. Further, depending on the desiccation condition, it may be possible to store for from 2 to 3 years.

The reactive hot melt adhesive of the present invention is excellent in storage stability and exhibits excellent bonding and durability, particularly heat resistance, chemical resistance and water resistance, by crosslinking after bonding.

Applications

The reactive hot melt adhesive of the present invention can be applied to all adherends which can be bonded by a usual polyurethane adhesive.

As such an adherend, a base material made of e.g. a fabric, a synthetic resin, a metal, ceramic, wood material, synthetic leather or natural leather, may be mentioned. The reactive hot melt adhesive of the present invention is particularly suitable for an application wherein a base material made of a fabric and/or a synthetic resin is used as the adherend.

As the base material made of a woven fabric or a non woven fabric of nylon, polyester, acrylic, cotton or other material, or a laminate containing such a woven fabric or a non woven fabric as a constituting material, is preferred.

As the base material made of a synthetic resin, a base material made of a polyurethane resin, a polyester resin, a polyvinyl chloride resin, a polyethylene resin, a silicon modified polyurethane resin, a polytetrafluoroethylene (hereinafter referred to as PTFE) or an ethylene.tetrafluoro-ethylene copolymer (hereinafter referred to as ETFE), is preferred. A sheet of such a synthetic resin or a laminate containing the synthetic resin sheet as a constituting material is particularly suitable as the adherend.

Further, a laminate of a base material made of a fabric and a base material made of a synthetic resin, is also suitable. Particularly preferred is a laminate comprising a fabric base material and a polyethylene resin, PTFE or ETFE laminated thereon. Further, PTFE and ETFE are preferably a porous PTFE and a porous ETFE, respectively. A laminate comprising a fabric base material and a polyethylene resin, PTFE or ETFE laminated thereon, which has water-proof moisture-permeability, is preferred. The laminate having water-proof moisture-permeability is also called a water-proof moisture-permeable sheet.

The reactive hot melt adhesive of the present invention is an adhesive having a wide range of applications. For example, as it can be formed into a film shape, it shows an excellent aptitude for an application wherein accuracy in thickness of the adhesive is of importance, or an application wherein too much infiltration to the adherend is problematic. Further, the reactive hot melt adhesive of the present invention is a hot melt type, and nevertheless, it is excellent in heat resistance as compared with a conventional one, and therefore suitable for an application to a product which requires a heating step after bonding.

As specific applications, it can be applied for bonding for automobiles, building materials, carpenter.furniture, bookbinding, electric, shoe products, cloth.fabric and natural or synthetic leather products. It exhibits excellent effects for applications wherein lack of heat resistance is problematic with a conventional hot melt type adhesive, or applications wherein lack of adhesion becomes a problem.

The fields wherein lack of heat resistance is problematic include e.g. bonding of interior parts of an automobile, and bonding of a sheet and a foam body. Further, it is effective for bonding of a product which requires a heating step after bonding.

Further, it is suitable for bonding of cloth-fabric as it is excellent in flexibility, and it is particularly preferred to be used for e.g. a sealing tape for seam portions in which lack of adhesion is pointed out, bonding interlining, a tape for fastening lower ends of trousers or a Wappen, as it shows an excellent adhesion without impairing the feeling of the cloth.

The reactive hot melt adhesive of the present invention can be used also for bonding sheets such as woven fabrics, non woven fabrics, thermosetting resin sheets or thermoplastic resin sheets.

Adhesive Composite Sheet Material

The reactive hot melt adhesive of the present invention is particularly suitable for an application wherein it is laminated with a surface layer and used in the form of an adhesive composite sheet.

Namely, the present invention provides an adhesive composite sheet material, which comprises a surface layer and an adhesive layer made of the reactive hot melt adhesive laminated therewith.

The material for the surface layer is not particularly limited, and various sheet materials may be used depending on the particular purposes. It may be either a single layer sheet or a laminate.

As the surface layer, it is preferred to use the above-mentioned base material made of a fabric and/or a synthetic resin, and particularly preferably a laminate of a base material made of a fabric and a base material made of a synthetic resin. In the case of using the laminate, it is possible to use a multi layer sheet already laminated, or it is possible to laminate the surface layer at the same time or after the adhesive layer is laminated.

Since the adhesive composite sheet material is used by heat melting the adhesive layer, the surface layer is required to have a heat resistance at a temperature higher than the adhesive, so that it can support the adhesive which is melt during the heat melting of the adhesive layer. Further, durability such as water resistance, hydrolysis resistance, chemical resistance, weather resistance or abrasion resistance, equal to or higher than the adhesive, is required for the surface layer. Practically, from the viewpoint of the outer appearance, it is preferred to use for the surface layer the same material as the adherend, on which the adhesive composite sheet material is bonded.

Method for Producing the Adhesive Composite Sheet Material

The lamination of the surface layer and the adhesive layer is carried out by bonding the reactive hot melt adhesive which is preliminarily formed into a sheet shape, with a sheet to be the surface layer. The bonding can be carried out by heating the reactive hot melt adhesive preferably at a temperature lower by at least 20° C. than the block dissociation temperature. Otherwise, it is possible to carry out the lamination by extruding the adhesive on the sheet to be the surface layer at the time of the extrusion processing of the reactive hot melt adhesive into a film shape. Further, in a case where the sheet to be the surface layer is a thermoplastic resin, it is possible to carry out the lamination by co-extrusion with the reactive hot melt adhesive.

The obtained adhesive composite sheet material can be used as cut into e.g. a tape shape depending on the particular application.

In its use, it is applied to the adherend, followed by heating at a temperature higher than the block dissociation temperature for a predetermined time, whereby it is bonded to the adherend. It is also possible to heat the adhesive at a temperature lower than the block dissociation temperature and at which the reactive hot melt adhesive can be melt and bonded to the adherend, followed by moisture-heat treatment for complete bonding. As the heating method, one conducted by using e.g. a hot roller, a hot press, an iron or a hot air machine, may be mentioned.

As an application of the adhesive composite sheet material, it is suitable for a material for mending the seam portions of a sewn product, a sealing tape for a sewn product, a material for mending the mending portions of a sewn product, a tape for fastening the lower ends of a sewn product of e.g. clothing such as trousers or skirts, or a material for mending a sewn product such as a patch, a bonding interlining or a Wappen.

For a sewn product, it is particularly preferred to use a base material made of the above-mentioned fabric and/or the synthetic resin, and the sewn product is particularly preferably made of the same material as the surface layer of the adhesive composite sheet material.

Further, the adhesive composite sheet material can be used for a product made of a material made of a fabric and/or a synthetic resin other than a sewn product, for example, a material for mending the crack portions of e.g. a waterproof sheet or a sheet made of a synthetic resin such as a synthetic leather.

EXAMPLES

Example 1

100 Parts by weight (hereinafter referred to as "parts" for short) of polyesterdiol having a hydroxyl number of 110, made by a reaction of adipic acid, ethylene glycol and 1,4-butanediol, and 55.0 parts of 4,4'-diphenyl methane diisocyanate were reacted at a temperature of 80° C. for two hours, to obtain a polyurethane prepolymer having isocyanate groups at the ends. Then, 7.9 parts of 1,4-butanediol (hydroxyl number: 1245) and 8.3 parts of ε-caprolactam as a blocking agent, were added thereto, and the mixture was reacted at a temperature of 120° C. for four hours, to obtain a blocked prepolymer (block dissociation temperature: 170° C.). Here, in each Example except in Example 4, the end point of the reaction with a blocking agent was confirmed by disappearance of the absorption of isocyanate groups in the IR spectrum.

The obtained blocked prepolymer was crushed into a flake shape by a mill, then the flake-shaped blocked prepolymer was formed into a film shape having a thickness of 100 μm by extrusion molding, by using a extrusion molding device at a die temperature of 125° C., to obtain a film-shaped resin.

Example 2

The same operation was carried out as in Example 1 except that 6.4 parts of ethyl methyl ketoxime was used instead of ε-caprolactam, to obtain a film-shaped resin (block dissociation temperature of the blocked prepolymer: 145° C.).

Example 3

100 Parts of polyoxytetramethylene glycol having a hydroxyl number of 110, and 59.2 parts of 4,4'-diphenyl methane diisocyanate were reacted at a temperature of 80° C. for two hours, to obtain a polyurethane prepolymer having isocyanate groups at the ends. Then, 9.2 parts of 1,4-butanediol and 8.9 parts of ε-caprolactam as a blocking agent were added thereto, and the mixture was reacted at a temperature of 120° C. for four hours, to obtain a blocked prepolymer (block dissociation temperature: 170° C.). The obtained blocked prepolymer was formed in the same manner as in Example 1, to obtain a film-shaped resin.

Example 4

The film-shaped resin obtained by Example 1, was stored for six months, at a temperature of 20° C. under a relative humidity of 60%.

Example 5

(Comparative Example)

98 Parts of polyesterdiol having a hydroxyl number of 56, made by a reaction of adipic acid, ethylene glycol and 1,4-dibutanediol, 84 parts of polyoxytetramethylene glycol having a hydroxyl number of 112, and 73 parts of 4,4'-diphenyl methane diisocyanate were reacted at a temperature of 80° C. for two hours, to obtain a polyurethane prepolymer having isocyanate groups at the ends. Then, 36 parts of ε-caprolactam as a blocking agent was added thereto, and the mixture was reacted at a temperature of 120° C. for four hours, to obtain a blocked prepolymer. The obtained blocked prepolymer was clay-like, so that it could not be crushed, and could not be formed into a film shape.

Example 6

(Comparative Example)

125 Parts of polyesterdiol having a hydroxyl number of 112, made by a reaction of adipic acid and ethylene glycol, 45 parts of polyoxypropylene triol having a hydroxyl number of 168 obtained by a reaction of glycerol and propylene oxide, and 74 parts of 4,4'-diphenyl methane diisocyanate were reacted at a temperature of 80° C. for two hours, to obtain a polyurethane prepolymer having isocyanate groups at the ends. Then, 18 parts of methyl ethyl ketoxime was added thereto, and the mixture was reacted at a temperature of 120° C. for four hours, to obtain a blocked prepolymer. The obtained blocked prepolymer was crushed into a flake shape by a mill. Then, it was tried to form the flake-shaped blocked prepolymer into a film shape by extrusion molding. However, the resin was thermally cured, and it could not be molded.

Example 7

(Comparative Example)

98 Parts of polyesterdiol having a hydroxyl number of 56, made by a reaction of adipic acid, ethylene glycol and 1,4-butanediol, and 55.0 parts of 4,4'-diphenyl methane diisocyanate were reacted at a temperature of 80° C. for two hours, to obtain a polyurethane prepolymer having isocyanate groups at the ends. Then 11.6 parts of 1,4-butanediol was added thereto, and the mixture was reacted at a temperature of 120° C. for four hours, to obtain a blocked prepolymer. The obtained blocked prepolymer was formed in the same manner as in Example 1, to obtain a film-shaped resin.

Evaluation of the Adhesive

The number average molecular weight and the melt viscosity (unit: poise) at a temperature of 110° C. of the blocked prepolymer obtained in each of Examples 1 to 7, are shown in Table 1. The number average molecular weight was measured by GPC. The number average molecular weight of the blocked prepolymer obtained in Example 5 was 6,500 and the melt viscosity was 200 poise. The blocked prepolymer obtained in Example 6 was not soluble in a solvent, so that the number average molecular weight could not be measured, and it did not melt, so that the melt viscosity could not be measured either.

With the film-shaped resins obtained in Examples 1 to 4 and Example 7, the following tests (1) to (3) were carried out.

(1) Test in Physical Properties Oh the Film

The physical properties of the obtained film-shaped resin were measured. Namely, the extension (unit: %), 100% modulus $M_{100}$ (unit: kg/cm$^2$), tensile strength $T_s$. (unit: kg/cm$^2$), tear strength $T_r$ (unit: kg/cm) were measured at a pulling rate of 300 mm/min.

Further, the blocking agent in the film-shaped resin was dissociated under dissociation conditions shown in the table, curing was conducted for six days at a temperature of 20° C. under a relative humidity of 60%, and the physical properties at room temperature and temperatures of 80° C. and 100° C. were measured in the same manner. The blocked prepolymer obtained in Example 7 was not blocked, so that the dissociation conditions were not necessary, and properties of the blocked prepolymer obtained in Example 7 were measured at temperatures of 80° C. and 100° C. The results are shown in Table 1. In Table 1, 'NG' means that it was impossible to measure since the strength was weak.

(2) Test in Peel Strength

The obtained film-shaped resin was sandwiched between two adherends, and heated at a temperature of 190° C. for 30 seconds on a hot plate, while exerting a pressure of 0.22 kg/cm² thereto. The curing was conducted at a temperature of 20° C. under a relative humidity of 60% for six days to obtain a laminate. The peel strength of the laminate was measured (unit: kg/inch) in an atmosphere of room temperature, 120° C. and 150° C., at a peeling rate of 200 mm/min. As the adherends, polyester taffeta, nylon taffeta and cotton broad were used. The results are shown in Table 2. In Table 2, 'NG' means that it was impossible to measure since the strength was weak.

(3) Test in Repeated Washing and Drying

Washing and tumbler drying were repeated for ten times with respect to a laminate obtained in the same manner as in above (2), and the peeling was observed. The evaluation was made on the basis of: ⊚: no peeling, ○: partial peeling, X: peeled. The results are shown in Table 2.

Examples 8 to 11

The film-shaped resin obtained in each of Examples 1 to 4, and a porous PTFE film were put one on the other and press-bonded, by using a roll heated to 80° C., to obtain an adhesive composite sheet.

Example 12

(Comparative Example)

The same operation was carried out as in Example 8 except that the film-shaped resin obtained in Example 7 was used instead of the film-shaped resin obtained in Example 1, to obtain an adhesive composite sheet.

Evaluation of the Adhesive Composite Sheet

The obtained adhesive composite sheet was cut into a width of 2 cm to obtain a tape-shaped sample. With this sample, the following tests (4) and (5) were carried out.

(4) Test in Heat Resistant Peeling Strength

A porous PTFE film and a nylon cloth were overlaid to obtain a waterproof moisture-permeable laminate, and the tape-shaped sample was hot-pressed by an iron, on the porous PTFE film side of the waterproof moisture-permeable laminate. At that time, 5 cm at one end of the tape-shaped sample was left to be not hot-pressed.

After the curing was conducted at a temperature of 20° C. under a relative humidity of 60% for six days, the peel strength of the tape-shaped sample was measured at room temperature and temperatures of 120° C. and 150° C. The results are shown in Table 3. In every Example, at room temperature, the porous PTFE film in the laminate as the adherend, was peeled (namely, this means that the strength as an adhesive was enough).

(5) Test in Repeated Washing

Using two laminates obtained by overlaying a porous PTFE film and a nylon cloth, the porous PTFE film side was presumed to be the surface and the nylon cloth the back side, and they were sewn by a sewing machine, so that the surfaces faced each other, with a margin to sew up of 5 mm, to obtain a sewn product sample. As shown in FIG. 1, the tape-shaped sample was hot pressed on the seam portions of the back side of the sewn product to obtain a sealing sample.

With respect to the sealing sample, a leakage test was conducted by putting a hydraulic pressure of 0.2kg/cm² on the surface side for two minutes. It was confirmed that there was no leakage of water, whereupon the washing was repeated for 10 times, and it was visually confirmed that there was no partial peeling. Then, the leakage test was conducted again, and one with which no leakage was confirmed, was rated as "passed". In each case, the same three sealing samples were prepared and tested. The evaluation was made on the basis of: ⊚: three samples passed, ○: two samples passed, X: no sample passed. The results are shown in Table 3.

TABLE 1

|  |  |  | Ex. 1 | Ex. 2 | Ex. 3 | Ex. 4 | Ex. 7 |
|---|---|---|---|---|---|---|---|
|  |  |  | 25,000 | 24,000 | 23,000 | 27,000 | 32,000 |
|  |  |  | 35,000 | 32,000 | 28,000 | 42,000 | 24,000 |
| Physical properties before dissociation of blocking agent | Room temp. | Extension | 622 | 718 | 657 | 597 |  |
|  |  | M₁₀₀ | 38 | 32 | 34 | 35 |  |
|  |  | T_s | 70 | 51 | 64 | 65 |  |
|  |  | T_r | 36 | 48 | 42 | 34 |  |
| Dissociation conditions |  |  | 205° C. × 5 min | 190° C. × 5 min | 205° C. × 5 min | 205° C. × 5 min | Dissociation was not required |
| Physical properties after dissociation of blocking agent | Room temp. | Extension | 520 | 484 | 502 | 525 | 525 |
|  |  | M100 | 60 | 54 | 46 | 63 | 46 |
|  |  | T_s | 465 | 430 | 380 | 440 | 108 |
|  |  | T_r | 123 | 115 | 105 | 117 | 51 |
|  | 80° C. | Extension | >2000 | 1843 | >2000 | >2000 | 726 |
|  |  | T_s | 65 | 59 | 32 | 60 | 14 |
|  | 100° C. | Extension | >2000 | 1840 | >2000 | >2000 | NG |
|  |  | T_s | 25 | 18 | 11 | 23 | NG |

TABLE 2

|  | Adherend | Ex. 1 | Ex. 2 | Ex. 3 | Ex. 4 | Ex. 7 |
|---|---|---|---|---|---|---|
| Test in peel strength Room temp. | Polyester | 2.4 | 2.2 | 1.6 | 2.0 | 2.0 |
|  | Nylon | 4.9 | 4.7 | 3.8 | 4.2 | 2.1 |
|  | Cotton | >7.0 | 6.5 | 5.2 | 4.9 | 6.0 |
| Test in peel strength 120° C. | Polyester | 2.1 | 1.9 | 1.2 | 1.7 | NG |
|  | Nylon | 1.3 | 0.9 | 0.7 | 1.1 | NG |
|  | Cotton | 5.0 | 5.2 | 4.2 | 4.3 | NG |
| Test in peel strength 150° C. | Polyester | 0.2 | 0.2 | 0.1 | 0.2 | NG |
|  | Nylon | 0.1 | 0.1 | 0.1 | 0.1 | NG |
|  | Cotton | 0.3 | 0.2 | 0.1 | 0.1 | NG |

TABLE 2-continued

|  | Adherend | Ex. 1 | Ex. 2 | Ex. 3 | Ex. 4 | Ex. 7 |
|---|---|---|---|---|---|---|
| Test in repeated washing | Polyester | ◎ | ◎ | ○ | ◎ | X |
|  | Nylon | ◎ | ○ | ○ | ◎ | X |
|  | Cotton | ◎ | ◎ | ○ | ◎ | ○ |

TABLE 3

|  | Ex. 8 | Ex. 9 | Ex. 10 | Ex. 11 | Ex. 12 |
|---|---|---|---|---|---|
| Film-shaped resin | Ex. 1 | Ex. 2 | Ex. 3 | Ex. 4 | Ex. 7 |
| Test in heat resistant peel strength |  |  |  |  |  |
| 120° C. | 1.5 | 0.8 | 0.9 | 1.2 | 0.02 |
| 150° C. | 0.7 | 0.4 | 0.5 | 0.6 | 0.02 |
| Test in repeated washing | ◎ | ◎ | ○ | ◎ | X |

The reactive hot melt adhesive of the present invention is excellent in storage stability, initial bonding property and heat resistance after bonding and curing. Further, it is easy to make the thickness of the adhesive layer uniform and to preliminarily process it into the required shape, and the process at the work site can be simplified. It can be used also in a case where too much infiltration of an adhesive component into an adherend tends to be a problem.

It is hot melt type. Nevertheless, it is excellent in heat resistance as compared with the conventional products. Therefore, it can be applied to a product which requires a heating step after bonding.

What is claimed is:

1. A reactive hot melt adhesive comprising, as the main component, a blocked prepolymer made by reacting a linear prepolymer having isocyanate groups with a blocking agent, said blocked prepolymer having a number average molecular weight of at least 11,000 and a melt viscosity of at least 1,000 poise at a temperature of 110° C.

2. The reactive hot melt adhesive according to claim 1, wherein the linear prepolymer having isocyanate groups is obtained by reacting an organic diisocyanate and a high molecular weight diol having a hydroxyl number of from 40 to 400 and, if desired, a low molecular weight diol having a hydroxyl number of higher than 400, so that isocyanate groups are in excess to hydroxyl groups.

3. The reactive hot melt adhesive according to claim 1, which is formed by forming the blocked prepolymer or a composition containing the blocked prepolymer into a shape selected from the group consisting of a film shape, a tape shape, a tube shape, a bead shape, a powder shape and a flake shape.

4. The reactive hot melt adhesive according to claim 3, which is formed by extrusion molding at a temperature lower than a dissociation temperature of the blocking agent.

5. The reactive hot melt adhesive according to claim 3, wherein a base material made of a fabric and/or a synthetic resin is used as an adherend.

6. An adhesive composite sheet material, which comprises an adhesive layer made of the reactive hot melt adhesive as defined in claim 1, and a surface layer laminated therewith.

7. The adhesive composite sheet material, which comprises an adhesive layer made of the reactive hot melt adhesive as defined in claim 3, and a surface layer laminated therewith.

8. A method of using an adhesive composite sheet material, the method comprising mending with the adhesive composite sheet material of claim 6 at least one of a seam portion of a sewn product made of moisture permeable waterproof sheet and a mending portion of a sewn product made of moisture permeable waterproof sheet.

9. A method of using an adhesive composite sheet material, the method comprising mending with the adhesive composite sheet material of claim 7 at least one of a seam portion of a sewn product made of moisture permeable waterproof sheet and a mending portion of a sewn product made of moisture permeable waterproof sheet.

10. A reactive hot melt adhesive comprising, as the main component, a blocked prepolymer made by reacting a linear prepolymer having isocyanate groups with a blocking agent and a low molecular weight diol having a hydroxyl number of higher than 400, said blocked prepolymer having a number average molecular weight of at least 11,000 and a melt viscosity of at least 1,000 poise at a temperature of 110° C.

11. The reactive hot melt adhesive according to claim 10, wherein the linear prepolymer having isocyanate groups is obtained by reacting an organic diisocyanate and a high molecular weight diol having a hydroxyl number of from 40 to 400 and, if desired, a low molecular weight diol having a hydroxyl number of higher than 400, so that isocyanate groups are in excess to hydroxyl groups.

12. The reactive hot melt adhesive according to claim 10, which is formed by forming the blocked prepolymer or a composition containing the blocked prepolymer into a shape selected from the group consisting of a film shape, a tape shape, a tube shape, a bead shape, a powder shape and a flake shape.

13. The reactive hot melt adhesive according to claim 6, which is formed by extrusion molding at a temperature lower than a dissociation temperature of the blocking agent.

14. The reactive hot melt adhesive according to claim 6, wherein a base material made of a fabric and/or a synthetic resin is used as an adherend.

15. The adhesive composite sheet material, which comprises an adhesive layer made of the reactive hot melt adhesive as defined in claim 10, and a surface layer laminated therewith.

16. The adhesive composite sheet material, which comprises an adhesive layer made of the reactive hot melt adhesive as defined in claim 12, and a surface layer laminated therewith.

17. A method of using an adhesive composite sheet material, the method comprising mending with the adhesive composite sheet material of claim 15 at least one of a seam portion of a sewn product made of moisture permeable waterproof sheet and a mending portion of a sewn product made of moisture permeable waterproof sheet.

18. A method of using an adhesive composite sheet material, the method comprising mending with the adhesive composite sheet material of claim 16 at least one of a seam portion of a sewn product made of moisture permeable waterproof sheet and a mending portion of a sewn product made of moisture permeable waterproof sheet.

* * * * *